United States Patent [19]

Cella et al.

[11] Patent Number: 4,837,298

[45] Date of Patent: Jun. 6, 1989

[54] CYCLIC IMIDES FROM SPIROBIINDANE DIAMINES AND METHODS OF PREPARATION

[75] Inventors: James A. Cella, Clifton Park; Thomas L. Guggenheim, Scotia, both of N.Y.

[73] Assignee: General Electric Company, Schenectady, N.Y.

[21] Appl. No.: 64,650

[22] Filed: Jun. 22, 1987

[51] Int. Cl.[4] .............................................. C08G 63/02
[52] U.S. Cl. ..................................... 528/352; 528/128; 528/172; 528/183; 528/185; 528/188; 528/189
[58] Field of Search ............... 528/352, 185, 128, 172, 528/183, 188, 189

[56] References Cited

U.S. PATENT DOCUMENTS 4,734,482  3/1988  Tamai et al. ..................... 528/185

*Primary Examiner*—John Kight
*Assistant Examiner*—M. L. Moore
*Attorney, Agent, or Firm*—William H. Pittman; James C. Davis, Jr.; James Magee, Jr.

[57] ABSTRACT

Cyclic imides are prepared by the reaction of a bis(dicarboxyphenyl) sulfide or functional derivative thereof, and optionally a second tetracarboxylic acid or functional derivative thereof such as 2,2-bis[4-(3,4-dicarboxyphenoxy)phenyl]propane dianhydride, with a diamine having a spirobiindane nucleus. The cyclic imides may be converted to linear polyimides by reaction with a basic alkali metal sulfide.

14 Claims, No Drawings

CYCLIC IMIDES FROM SPIROBIINDANE DIAMINES AND METHODS OF PREPARATION

This invention relates to imides, and more particularly to cyclic imides convertible to polyimides.

Polyimides are a valuable class of resinous materials useful in many areas including molding and manufacture of electrical components. Particularly useful properties of polyimides are high thermal stability and solvent resistance. For the most part, polyimides are prepared by the reaction of diamines with tetracarboxylic acids or their derivatives, usually dianhydrides.

A recent innovation in the preparation of certain linear polymers involves the use of cyclic oligomer compositions as intermediates. For example, cyclic polycarbonate oligomer mixtures, disclosed in U.S. Pat. No. 4,644,053, are readily convertible under very favorable conditions to linear polycarbonates of very high molecular weight. Similar classes of cyclic polyarylates and cyclic polyamides are disclosed respectively in copending, commonly owned applications Ser. No. 920,540, filed Oct. 20, 1986, and Ser. No. 20,264, filed Feb. 27, 1987.

It has become of interest to develop intermediates for the preparation of polyimides which are analogous to said cyclic polycarbonate oligomers. Such intermediates have potential for conversion to linear polyimides, and also to random and block copolyimides including polyimide-polycarbonates. The present invention provides a class of novel cyclic polyimides (and their polyamic acid precursors) which may be so converted, as well as methods for their preparation and conversion.

In one of its aspects, the present invention includes compositions comprising (1) cyclic compounds of the formula

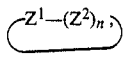
(I)

wherein:
$Z^1$ is

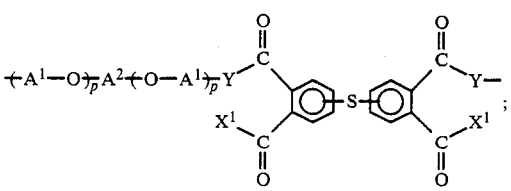
(II)

$Z^2$ is

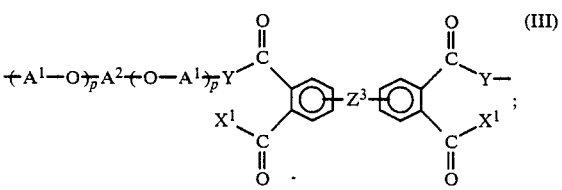
(III)

$A^1$ is m- or p-phenylene;
$A^2$ is

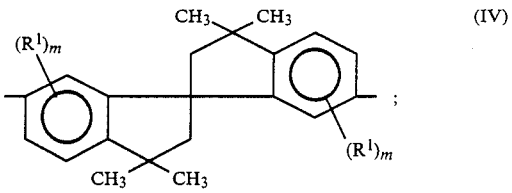
(IV)

$R^1$ is $C_{1-4}$ primary or secondary alkyl or halo;
$Z^3$ is a single bond, $-R^2-$, $-O-$, $-CO-$, $-SO_2-$, $-O-Q-O-$ or $-SO_2-Q-SO_2-$;
$R^2$ is a divalent aliphatic or alicyclic radical containing about 1-12 carbon atoms;
Q is a divalent aliphatic or aromatic radical;
$X^1$ is OH and Y is NH, or $X^1$ and Y taken together are N;
m is from 0 to 3;
n is 0 or 1; and
p is 0 or 1; and
(2) corresponding higher cyclic oligomers.

It will be apparent from formula IV that the cyclic compounds of this invention are derivatives of diamines in which the $A^2$ moiety is a 3,3,3',3'-tetramethyl-1,1'-spiro(bis)indane nucleus, hereinafter sometimes referred to as a "spirobiindane" nucleus for brevity. The $R^1$ values are each $C_{1-4}$ primary or secondary alkyl or halo and are preferably methyl or chloro. The value of m is 0–3, usually 0 or 1 and preferably 0.

Among the useful diamines are those in which p is 0; i.e., the 6,6'-diamino-3,3,3',3'-tetramethyl-1,1-spiro(bis)indanes. They may be prepared, for example, in accordance with Curtis et al., *J. Chem. Soc.*, 1962, 418–421.

The preferred diamines, however, are those in which p is 1. They may be characterized as bis-aminophenyl ethers of spirobiindane bisphenols and especially of 6,6'-dihydroxy-3,3,3',3'-tetramethyl-1,1-spiro(bis)indane, hereinafter "SBI". The $A^1$ radicals therein may be either m-phenylene or p-phenylene and are most often p-phenylene.

The cyclic compounds in the compositions of the invention may include imides, wherein X and Y taken together are N, and/or amic acids, wherein X is OH and Y is NH. The amic acids are frequently present as intermediates wherein the amic acid units are converted to imide units either during the preparation of the cyclic imide or subsequently, when it is converted to a linear polyimide.

The compositions of the invention include compounds of formula I containing only $Z^1$ moieties (n is 0) and compounds containing $Z^1$ and $Z^2$ moieties (n is 1). Also included are mixtures of compounds of formula I with cyclic compounds containing only $Z^2$ moieties.

That is, the compositions of the invention may include cyclic imide molecules (and/or their amic acid precursors) containing only structural units of formula II, others containing units of both formulas II and III, and possibly still others containing only units of formula III. During conversion to linear polyimides as described hereinafter, any molecular species containing only units of formula III will remain unpolymerized. While this is frequently not harmful, it provides no particular benefit. Therefore, the preferred compositions of the invention are those in which a major proportion, and most preferably all, of the molecular species contain units of formula II.

The units of formula III are derived from one or more tetracarboxylic acids characterized by the presence of a $Z^3$ linking moiety between the phthalic acid rings. The $Z^3$ moiety may be a divalent aliphatic or alicyclic radical containing about 1–12 and preferably about 1–6 carbon atoms, illustrated by methylene, ethylene, propylene, trimethylene, ethylidene, cyclopentylidene and cyclohexylidene. Other suitable $Z^3$ values are oxygen atoms, carbonyl groups and sulfone groups.

Preferably, the $Z^3$ value is —O—Q—O— or —SO$_2$—Q—SO$_2$, wherein Q is a divalent aliphatic or aromatic radical. The aliphatic Q values genrally contain about 1–6 carbon atoms and may be as defined hereinabove with reference to $Z^3$.

More preferably, however, the Q values are aromatic radicals, which may be attached through oxygen to the aromatic rings in the 3- or 4-positions, preferably the 4positions, with respect to the carbonyl groups. Illustrative Q radicals of this type are derived from such compounds as resorcinol, hydroquinone, 4,4'-dihydroxybiphenyl, 4,4'-dihydroxy-3,3',5,5'-tetramethylbiphenyl, 4,4'-dihydroxydiphenylmethane, 3,4'-dihydroxydiphenylmethane, 2,2-bis(2-hydroxyphenyl)propane, 4,4-bis(4-hydroxyphenyl)propane ("bisphenol A"), 2-(3-hydroxyphenyl)-2-(4-hydroxyphenyl)propane, 1,1-bis(4-hydroxyphenyl)ethane, 2,2-bis(4-hydroxyphenyl)pentane, 4,4'-dihydroxybenzophenone, bis(4-hydroxyphenyl)ether, bis(4-hydroxyphenyl)sulfide, bis(4-hydroxyphenyl)sulfoxide, bis(4-hydroxyphenyl)sulfone and 3-hydroxyphenyl 4-hydroxyphenyl sulfone.

The most preferred Q values are those having the formulas

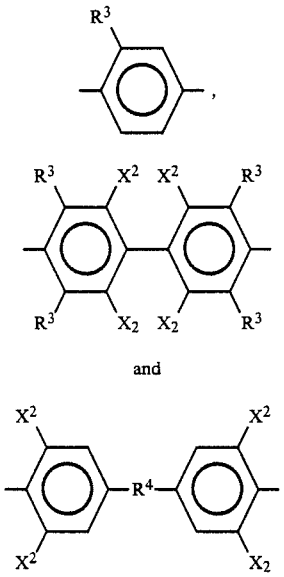

wherein each $R^3$ is independently hydrogen, methyl or halogen, $R^4$ is a straight chain or branched alkylene radical containing 1–5 carbon atoms and is most often the isopropylidene radical, and each $X^2$ is independently hydrogen or halogen (any halogens usually being chlorine or bromine). Especially desirable is the radical derived from bisphenol A by the removal of both hydroxy groups therefrom, and having formula VII wherein $R^4$ is isopropylidene and each $X^2$ is hydrogen. Thus, the preferred copolyimides are derived from 2,2-bis[4-(3,3-dicarboxyphenoxy)phenyl]propane or its dianhydride (hereinafter "BPADA"), its 2,3-dicarboxyphenoxy and mixed 2,3- and 3,4-dicarboxyphenoxy isomers, and mixtures thereof, with BPADA being preferred.

Analysis of the compositions of this invention by high pressure liquid chromatography and field desorption mass spectroscopy has shown that those with only $Z^1$ units typically contain cyclic oligomers having up to about 7 of such units. Similarly, compositions with both $Z^1$ and $Z^2$ units may contain cyclic compounds in which p is 0, corresponding compounds containing a $Z^2$ unit instead of a $Z^1$ unit, cyclic "copolymer" species in which p is 1, and higher "homopolymer" and "copolymer" species. Thus, the compositions containing compounds with both $Z^1$ and $Z^2$ moieties are often very complex mixtures.

The compositions of this invention may be prepared by reacting a diamine of the formula

with a sulfur-containing tetracarboxylic acid of the formula

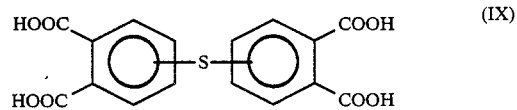

or a mixture thereof with a second tetracarboxylic acid of the formula

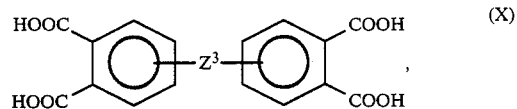

or functional derivatures of said tetracarboxylic acids, wherein $A^1$, $A^2$, $Z^3$ and p are as previously defined. Suitable functional derivatives include dianhydrides and bisimides containing electron-deficient N-substituents; the latter are disclosed in U.S. Pat. No. 4,578,470, the disclosure of which is incorporated by reference herein. The dianhydrides are preferred. Frequent reference to said dianhydrides will be made hereinafter, but it should be understood that the free acids and other appropriate functional derivatives may be substituted therefor. This method of preparing said compositions is another aspect of the invention.

The diamines of formula VIII wherein p is 1 may be prepared by the reaction of halonitrobenzenes or dinitrobenzenes with spirobiindane bisphenol salts under alkaline conditions in a dipolar aprotic solvent, followed by reduction of the resulting bis-nitrophenoxy ethers by conventional means such as catalytic hydrogenation. This method is described in the aforementioned application Ser. No. 20,264, the disclosure of which is incorporated by reference herein. The following examples are illustrative.

EXAMPLE 1

A reaction vessel fitted with a mechanical stirrer, reflux condenser and nitrogen purge means was charged with 45.9 grams (149 mmol.) of SBI, 49.31 grams (303 mmol.) of p-chloronitrobenzene, 61.68 grams (447 mmol.) of potassium carbonate and 700 ml. of dry dimethylformamide. The mixture was purged with nitrogen and heated at 150° C. with stirring for 14 hours. It was then poured into 1.5 liters of ice water with rapid stirring, and the precipitated 6,6'-bis(4-nitrophenoxy)-3,3,3',3'-tetramethyl-1,1'-spiro(bis)indane was recrystallized from methyl ethyl ketone. The yield was 73.7 grams (90% of theoretical) of a crystalline product, m.p. 200.5°–201.5° C. The structure was confirmed by elemental analysis.

A mixture of 5.27 grams (9.58 mmol) of the bis(nitrophenoxy) compound, 100 mg. of platinum oxide and 100 ml. of tetrahydrofuran was pressurized with hydrogen at 50 psi. and shaken for 3 hours at room temperature. The mixture was filtered, using a filter aid material, and the filtration residue was washed with methylene chloride. The combined filtrates were vacuum stripped to yield 4.6 grams (98% of theoretical) of 6,6'-(4-aminophenoxy)-3,3,3',3'-tetramethyl-1,1'-spiro(bis)indane, which was recrystallized from toluene to yield the pure product as fine crystals, m.p. 214°–215° C. The structure was confirmed by elemental analysis.

EXAMPLE '

In a reaction vessel similar to that of Example 1, a mixture of 24.51 grams (79.6 mmol.) of SBI, 27.40 grams (163.1 mmol.) of m-dinitrobenzene, 43.93 grams (318.4 mmol.) of potassium carbonate and 175 ml. of dimethyl sulfoxide was heated for 30 hours at 140° C., under nitrogen. The mixture was cooled and diluted with 500 ml. of methylene chloride, and was washed with 10% aqueous sodium hydroxide solution, water and aqueous sodium chloride solution. The organic phase was filtered and the filtration residue was rinsed with methylene chloride. The combined filtrates were vacuum stripped to yield 42.5 grams of the product as a thick oil. A portion of the oil was purified by medium pressure liquid chromatography of an ethyl acetate-hexane solution over silica gel. The purified 6,6'-(3-nitrophenoxy)-3,3,3',3'-tetramethyl-1,1'-spiro(bis)indane was obtained in 66% yield, m.p. 174°–175° C. The structure was confirmed by elemental analysis.

Following the procedure of Example 1, 2.5 grams (4.5 mmol.) of the bis(nitrophenoxy) compound was hydrogenated over a platinum oxide catalyst. Upon solvent removal and recrystallization from a toluene-cyclohexane mixture, there was obtained 1.8 grams (80% of theoretical) of analytically pure 6,6'-(3-aminophenoxy)-3,3,3',3'-tetramethyl-1,1'-spiro(bis)indane, m.p. 190°–197° C. with decomposition. The structure was confirmed by elemental analysis.

Dianhydrides corresponding to formula IX may be prepared by art-recognized methods including the method disclosed in U.S. Pat. No. 4,054,584. With respect to compositions containing only units of formula II, the preferred dianhydride is bis(2,3-dicarboxyphenyl)sulfide dianhydride. The isomeric bis(3,4-dicarboxyphenyl)sulfide dianhydride is generally preferably employed in combination with an additional dianhydride such as BPADA, since for the most part, compositions containing only units of formula I derived from bis(3,4-dicarboxyphenyl)sulfide are only sparingly soluble in organic solvents and do not melt below their decomposition temperatures. Most often, approximately equimolar proportions of the dianhydrides corresponding to formulas IX and X are employed, yielding a product containing approximately equimolar proportions of units of formulas II and III.

Diamines of formula VIII are particularly susceptible to formation of cyclic products upon reaction with dianhydrides. Therefore, it is not generally necessary to employ high dilution or other unusual reaction conditions for the preparation of the compositions of this invention. For the most part, approximately equimolar proportions of diamine and dianhydride are heated at a temperature in the range of about 150°–200° C., with water of reaction being removed by distillation. It is frequently preferred to employ a relatively high boiling organic solvent, typically a chlorinated aromatic hydrocarbon such as o-dichlorobenzene or a dipolar aprotic solvent such as dimethyl sulfoxide or dimethylacetamide. The presence of a metal carboxylate or oxygenated phosphorus compound as a catalyst, in accordance with U.S. Pat. Nos. 4,293,683 and 4,324,882, is also often beneficial. The disclosures of these patents are also incorporated by reference herein.

The preparation of the cyclic imides of this invention is illustrated by the following examples.

EXAMPLE 3

A dry blend of 652 mg. (2 mmol.) of bis(3,4-dicarboxyphenyl)sulfide dianhydride, 1043 mg. (2 mmol.) of BPADA, 1960 mg. (4 mmol.) of the diamine of Example 1 and 40 mg. of sodium phenylphosphonate was added over 45 minutes, with stirring, to 120 ml. of o-dichlorobenzene maintained at 140° C. The resulting solution was distilled slowly with removal of 60 ml. of distillate, including water of reaction. It was then heated under reflux for 3 hours, after which the solution was concentrated to about 20–25 ml. by distillation, cooled, poured into an excess of methanol and agitated in a blender. Upon filtration and drying of the residue in a vacuum oven, there was obtained 2.76 grams (79% of theoretical) of a solid product which was shown by liquid chromatographic analysis to be a mixture of cyclic polyimides and linear polymer comprising about 80% cyclics.

One gram of the crude product was extracted for 24 hours with acetone in a Soxhlet extractor. Upon precipitation from the acetone extract, there was obtained 300 mg. of a mixture of cyclic polyimides substantially free of linear polymer. It was shown by field desorption mass spectroscopy to contain the cyclic "monomer" of formula I wherein n is 0, the corresponding "monomer" of the diamine and BPADA, the cyclic "dimer" of the diamine and bis(3,4-dicarboxyphenyl)sulfide and the mixed "dimer" of formula I wherein n is 1. The residue from the extraction, comprising linear polyimide, had a glass transition temperature of 233° C.

EXAMPLE 4

A mixture of 1.956 grams (6 mmol.) of bis(2,3-dicarboxyphenyl)sulfide, 2.94 grams (6 mmol.) of the diamine of Example 1 and 60 mg. of sodium phenylphosphonate was added to o-dichlorobenzene and treated as in Example 3. The solid product (4.62 grams, or 98.7% of theoretical) was shown by liquid chromatographic analysis to comprise 80% cyclics. Upon extraction by acetone, 950 mg. of cyclics substantially free of linear polymer was obtained; field desorption mass spectroscopy showed the presence of the cyclic monomer and dimer. The residue from the extraction, comprising linear polyimides, had a glass transition temperature of 250.2° C.

EXAMPLE 5

A dry blend of 100 mg. (0.33 mmol.) of 6,6'-diamino-3,3,3',3'-tetramethyl-1,1'-spiro(bis)indane and 107 mg. (0.33 mmol.) of bis(2,3-dicarboxyphenyl)sulfide dianhydride is added over 30 minutes, with stirring, to a mixture of 20 ml. of o-dichlorobenzene and 1 mg. of sodium phenylphosphonate maintained at 100° C. The mixture is maintained at that temperature for 2 hours and then distilled until 5-7 ml. of distillate, including water of reaction, has been collected. It is then heated under reflux for 5 hours. Upon workup and extraction as in Example 3, the desired cyclic product is obtained.

The cyclic polyimides of this invention may be converted to linear polyimides by reaction with at least one basic sulfide of the formula M—S—$X^3$, wherein M is an alkali metal (usually sodium) and $X^3$ is M or an aryl radical, preferably phenyl. This method is another aspect of the invention.

The basic sulfide is generally employed in the amount of about 2-10 mole percent, preferably about 3-6 mole percent, based on structural units in the cyclic imide composition. The polymerization reaction may be conducted in bulk or in solution, typically in a polar aprotic solvent such as dimethylformamide, dimethylacetamide or dimethyl sulfoxide, and is generally conducted at temperatures in the range of about 150°-225° C. The polymerization mechanism involves ring-opening of the cyclic imide at the sulfur atom.

The polyimides produced by this method are similar to those disclosed in U.S. Pat. No. 3,983,093. They may be employed in applications typical of polyimides having relatively high thermal stability and solvent resistance.

The preparation of polyimides from the cyclic imides of this invention is illustrated by the following examples.

EXAMPLE 6

A 30% solids solution in dimethylacetamide of the substantially linear-free cyclic imide composition of Example 3 and 5 mole percent (based on structural units in said cyclic polyimide) of sodium sulfide was heated at 200° C. for 40 minutes. Analysis of the resulting solution by gel permeation chromatography indicated the presence of a polymer having a number average molecular weight of about 140,000, as well as low oligomers such as the BPADA cyclic monoimide. The solution was spread on a glass plate and heated in vacuum at 160° C., yielding a polymer film of good integrity. The glass transition temperature of the polymer was 230° C., identical to that of the extraction residue from Example 3.

EXAMPLE 7

The procedure of Example 6 was repeated, substituting lithium sulfide for the sodium sulfide. A similar product was obtained after a somewhat longer reaction time.

EXAMPLE 8

A mixture of 78 mg. of the substantially linear-free cyclic imide composition of Example 4, 0.023 ml. of a 0.02M solution of the sodium salt of thiophenol in dimethylacetamide and 0.4 ml. of dry dimethylacetamide was heated at 200° C. for about 1 hour, spread on a glass plate and heated in vacuum at 180° C. for an additional hour as the solvent was evaporated. There was obtained a linear polyimide which was shown by gel permeation chromatography to have a number average molecular weight of about 200,000.

What is claimed is:
1. A method for preparing a composition comprising
   (1) cyclic compounds of the formula

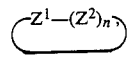

wherein:
$Z^1$ is

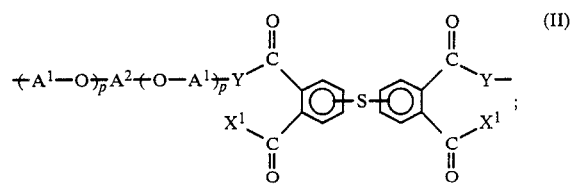

$Z^2$ is

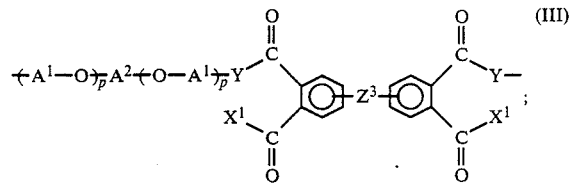

$A^1$ is m- or p-phenylene;
$A^2$ is

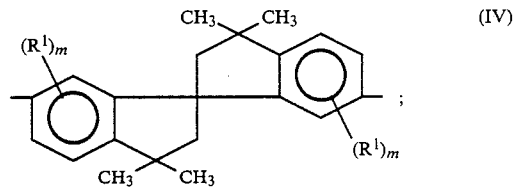

$R^1$ is $C_{1-4}$ primary or secondary alkyl or halo;
$Z^3$ is a single bond, —$R^2$—, —O—, —CO—, —$SO_2$—, —O—Q—O— or —$SO_2$—Q—$SO_2$—;
$R^2$ is a divalent aliphatic or alicyclic radical containing about 1-12 carbon atoms;
$Q_1$ is a divalent aliphatic or aromatic radical;
$X^1$ is OH and Y is NH, or $X^1$ and Y taken together are N;
m is from 0 to 3;
n is 0 or 1; and
p is 0 or 1; and
   (2) corresponding higher cyclic oligomers;
which comprises reacting a diamine of the formula

with a sulfur-containing tetracarboxylic acid of the formula

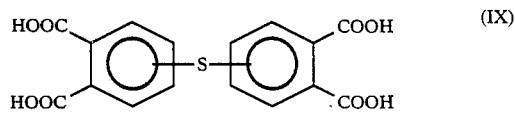

or a mixture thereof with a second tetracarboxylic acid of the formula

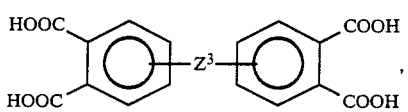

or functional derivatives of said tetracarboxylic acids.

2. A method according to claim 1 wherein the reaction is effected at a temperature in the range of about 150°–200° C. in a high boiling organic solvent.

3. A method according to claim 2 wherein $A^1$ is p-phenylene, m is 0 and p is 1.

4. A method according to claim 3 wherein n is 0 and the sulfur atom in formula II is in the 3-position with respect to the carboxy groups.

5. A method according to claim 3 wherein n 1, the sulfur atom in formula II is in the 4-position with respect to the carboxy groups, $Z^3$ is —O—Q—O— and Q has one of the formulas

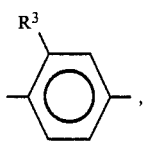

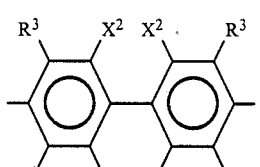

and

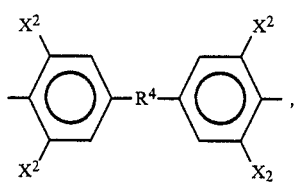

wherein each $R^3$ is independently hydrogen, methyl or halogen, $R^4$ is a straight chain or branched alkylene radical containing 1–5 carbon atoms and each $X^2$ is independently hydrogen or halogen.

6. A method according to claim 5 wherein Q has formula VII, $R^4$ is isopropylidene and each $X^2$ is hydrogen.

7. A method according to claim 6 wherein n and p are equal and $Z^3$ in formula III is in the 4-position with respect to the carboxy groups.

8. A method for preparing a linear polyimide which comprises reacting a composition comprising (1) cyclic compounds of the formula

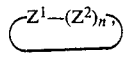

wherein:
$Z^1$ is

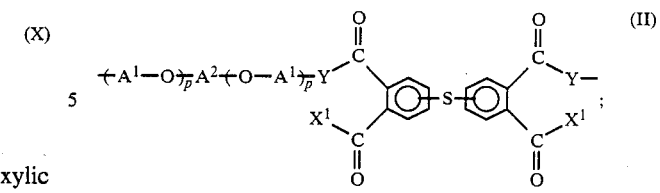

$Z^2$ is

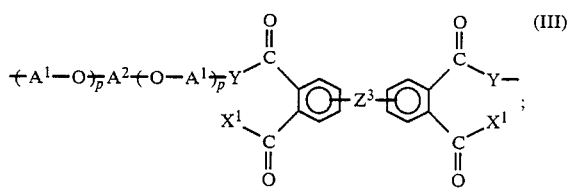

$A^1$ is m- or p-phenylene;
$A^2$ is

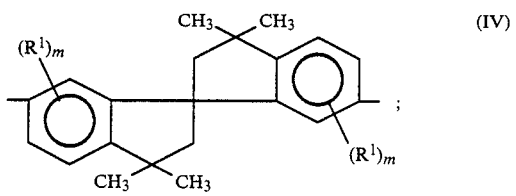

$R^1$ is $C_{1-4}$ primary or secondary alkyl or halo;
$Z^3$ is a single bond, —$R^2$—, —O—, —CO—, —$SO_2$—, —O—Q—O— or —$SO_2$—Q—$SO_2$—;
$R^2$ is a divalent aliphatic or alicyclic radical containing about 1–12 carbon atoms;
Q is a divalent aliphatic or aromatic radical;
$X^1$ is OH and Y is NH, or $X^1$ and Y taken together are N;
m is from 0 to 3;
n is 0 or 1; and
p is 0 or 1; and
(2) corresponding higher cyclic oligomers; with at least one basic sulfide of the formula M—S—$X^3$, wherein M is an alkali metal and X is M or an aryl radical.

9. A method according to claim 8 wherein the basic sulfide is employed in the amount of about 3–6 mole percent based on structural units in the cyclic imide composition and the reaction is conducted in solution in a polar aprotic solvent, at a temperature in the range of about 150°–225° C.

10. A method according to claim 9 wherein $A^1$ is p-phenylene, m is 0 and p is 1.

11. A method according to claim 10 wherein n is 0 and the sulfur atom in formula II is in the 3-position with respect to the carboxy groups.

12. A method according to claim 10 wherein n is 1 and the sulfur atom in formula II is in the 3-position with respect to the carboxy groups.

13. A method according to claim 12 wherein $Z^3$ is

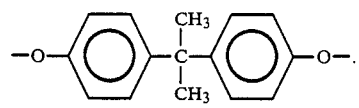

14. A method according to claim 13 wherein the second tetracarboxylic acid has the formula

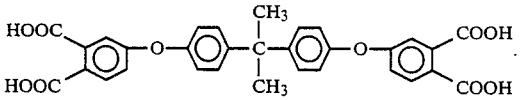

* * * * *